United States Patent
Sonogi

(10) Patent No.: US 10,768,867 B2
(45) Date of Patent: Sep. 8, 2020

(54) IMAGE FORMING APPARATUS HAVING HELD PRINT JOB ANALYSIS, CONTROL METHOD OF IMAGE FORMING APPARATUS, AND STORAGE MEDIUM

(71) Applicant: CANON KABUSHIKI KAISHA, Tokyo (JP)

(72) Inventor: Katsutoshi Sonogi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/810,894

(22) Filed: Nov. 13, 2017

(65) Prior Publication Data
US 2018/0143790 A1 May 24, 2018

(30) Foreign Application Priority Data
Nov. 18, 2016 (JP) .................................. 2016-224924

(51) Int. Cl.
*G06F 3/12* (2006.01)
*G06F 21/60* (2013.01)

(52) U.S. Cl.
CPC ............ *G06F 3/121* (2013.01); *G06F 3/1207* (2013.01); *G06F 3/1211* (2013.01);
(Continued)

(58) Field of Classification Search
CPC .............. G06K 15/1813; G06K 15/181; G06F 3/1248; G06F 3/1298; G06F 3/121; G06F 3/1207; G06F 3/1259
See application file for complete search history.

(56) References Cited

U.S. PATENT DOCUMENTS 6,473,192 B1 * 10/2002 Kidani .................. G06F 3/1284
358/1.14
7,126,703 B1 * 10/2006 Gillihan ................ G06F 3/1206
358/1.14
(Continued)

FOREIGN PATENT DOCUMENTS

JP 2007-286831 A 11/2007

OTHER PUBLICATIONS

English Machine Translation of JP 2016-068340-A (Takenaka, Published May 9, 2016) (Year: 2016).*

*Primary Examiner* — Juan M Guillermety
(74) *Attorney, Agent, or Firm* — Venable LLP

(57) ABSTRACT

An image forming apparatus performs hold printing in which a received print job is held and printing of the held print job is performed according to a print instruction from a user. The apparatus includes a display device, and a controller including a processor and a memory. The controller is configured to act as an analysis unit to analyze print data of the print job received and held by using a reception of the print job as a trigger, wherein a print process based on the received print job is not performed by using the reception of the print job as a trigger, a display control unit to display a job selection screen on the display device, wherein the job selection screen includes the one or more held print jobs, and a receiving unit to receive a selection of the held print job and the print instruction for the selected held print job, via the job selection screen. In the job selection screen, identification information of the held print job and error information corresponding to the held print job are displayed in association with each other based on the analysis of the analysis unit.

21 Claims, 7 Drawing Sheets

(52) U.S. Cl.
CPC .......... *G06F 3/1267* (2013.01); *G06F 3/1285* (2013.01); *G06F 21/608* (2013.01); *G06F 3/1259* (2013.01)

(56) References Cited

U.S. PATENT DOCUMENTS

| | | | | |
|---|---|---|---|---|
| 2003/0184800 A1* | 10/2003 | Ohara | ................ | G06K 15/1803 358/1.15 |
| 2004/0012806 A1* | 1/2004 | Murata | ................ | G06F 3/1207 358/1.14 |
| 2004/0165209 A1* | 8/2004 | Aoki | ................ | G06K 15/00 358/1.14 |
| 2006/0126099 A1* | 6/2006 | Nakagawa | ........... | G06K 15/002 358/1.14 |
| 2006/0282807 A1* | 12/2006 | Ivancic | ............... | G06F 11/3608 716/106 |
| 2007/0008584 A1* | 1/2007 | Kawabuchi | ........ | H04N 1/00408 358/1.15 |
| 2008/0235158 A1* | 9/2008 | Manchala | ............. | G06F 3/1285 705/400 |
| 2008/0297826 A1* | 12/2008 | Yamada | ................ | G06F 3/1259 358/1.14 |
| 2010/0064176 A1* | 3/2010 | Negishi | ................ | G06F 3/1256 714/37 |
| 2011/0161746 A1* | 6/2011 | Ooya | ................... | G06F 3/1285 714/57 |
| 2011/0242564 A1* | 10/2011 | Armstrong | ............. | G06F 3/121 358/1.13 |
| 2012/0050782 A1* | 3/2012 | Kawasaki | ............. | G06F 3/1207 358/1.14 |
| 2012/0229852 A1* | 9/2012 | Kubo | .................... | G06F 3/1234 358/1.15 |
| 2013/0100493 A1* | 4/2013 | Otsuka | ................. | G06F 3/1207 358/1.15 |
| 2013/0321849 A1* | 12/2013 | Masui | ..................... | G06F 3/121 358/1.14 |
| 2014/0085657 A1* | 3/2014 | Segawa | ................ | G06F 3/1285 358/1.13 |
| 2014/0253980 A1* | 9/2014 | Arai | .................... | H04N 1/00222 358/474 |
| 2014/0368866 A1* | 12/2014 | Kikumoto | ............ | G06F 3/1259 358/1.15 |
| 2015/0124284 A1* | 5/2015 | Ward | ..................... | G06F 3/121 358/1.15 |
| 2015/0213347 A1* | 7/2015 | Anno | ................... | G06K 15/1805 358/1.9 |
| 2015/0371126 A1* | 12/2015 | Ota | .................... | G06K 15/1809 358/1.14 |
| 2016/0105582 A1* | 4/2016 | Nakajima | ............. | G06F 3/1238 358/1.15 |
| 2016/0119489 A1* | 4/2016 | Ueno | ................... | G06F 3/121 358/1.15 |
| 2016/0188272 A1* | 6/2016 | Sakata | .................. | G06F 3/1256 358/1.15 |

\* cited by examiner

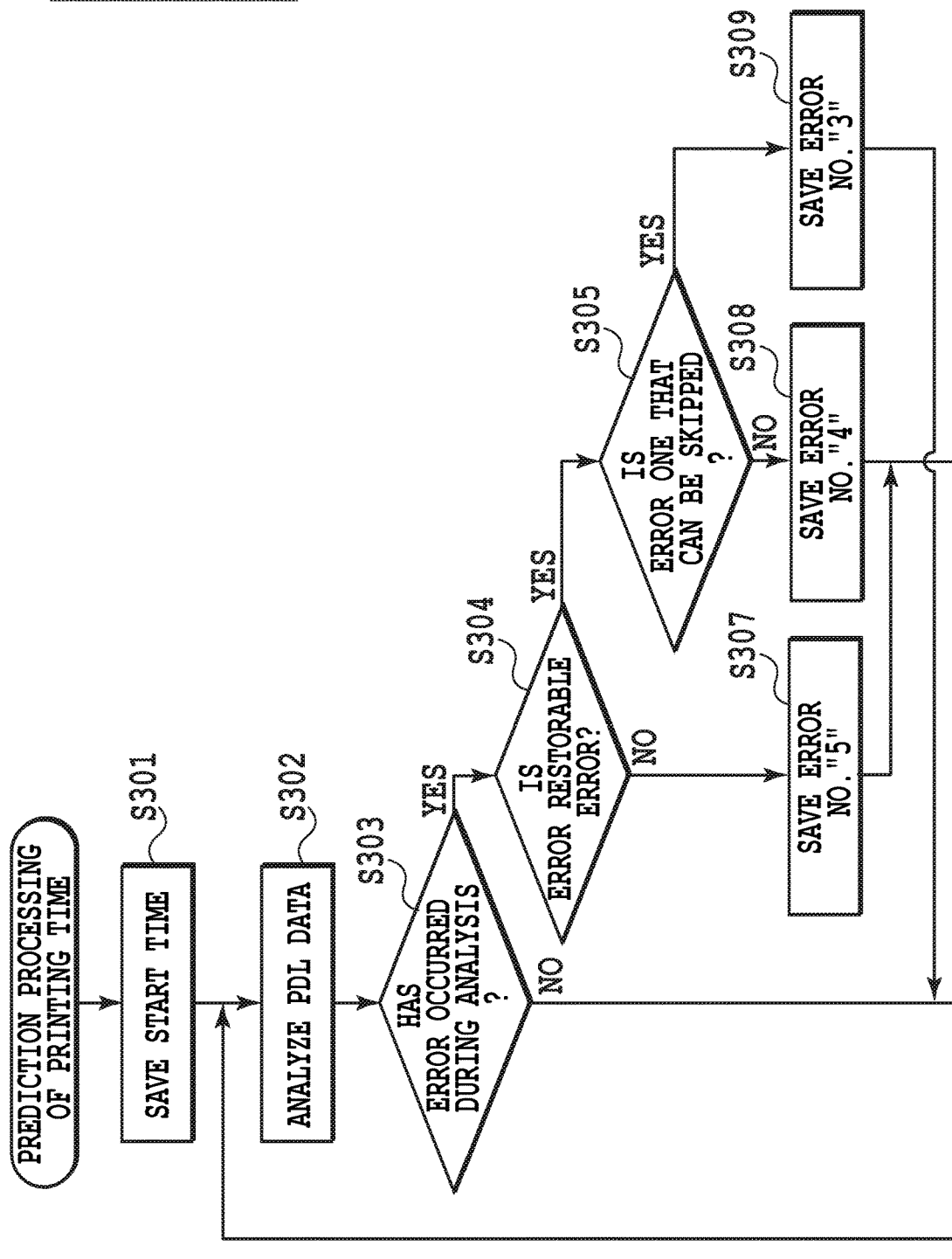

IMAGE FORMING APPARATUS HAVING HELD PRINT JOB ANALYSIS, CONTROL METHOD OF IMAGE FORMING APPARATUS, AND STORAGE MEDIUM

BACKGROUND OF THE INVENTION

Field of the Invention

The present invention relates to an image forming apparatus capable of performing hold printing in which a print job is temporarily held, a control method of the image forming apparatus, and a program.

Description of the Related Art

In recent years, because of an increase in awareness of security and cost reduction, a printing system exists that performs hold printing in which print data is saved in an image forming apparatus and printing is started after the image forming apparatus authenticates a user. In such a printing system, print data transmitted from a host PC (Personal Computer) is temporarily accumulated in the image forming apparatus or a server. At the time of a user logging in to the image forming apparatus, user authentication is performed and in the case where the user authentication has succeeded, the image forming apparatus displays a print job list of the user. Then, by a user specifying a print job from the print job list, printing of the print job is performed.

Japanese Patent Laid-Open No. 2007-286831 describes a printing apparatus that saves, in the case where an error has occurred while printing of a print job is performed, error information indicating the presence/absence of a print error in bibliographic information on the print job as a history. The printing apparatus described in Japanese Patent Laid-Open No. 2007-286831 displays the above-described error information in association with each print job within the list at the time of displaying the print job list. Due to this, it is possible for a user to recognize which print job in the print job list is the print job in which an error has occurred.

However, in the printing apparatus described in Japanese Patent Laid-Open No. 2007-286831, it is not possible to display the above-described error information for a print job for which printing is not performed yet, that is, a print job before printing starts. Consequently, for such a print job before printing starts, it is not possible for a user to recognize whether or not the print job is an incorrect print job in which an error occurs.

Consequently, an object of the present invention is to provide an image forming apparatus capable of notifying a user of whether a held print job is incorrect before starting printing in hold printing, a control method of the image forming apparatus, and a program.

SUMMARY OF THE INVENTION

The image forming apparatus according to the present invention is an image forming apparatus capable of performing hold printing in which a received print job is held and printing of the held print job is performed according to a print instruction from a user, the apparatus comprising: a display device; and a controller including a processor and a memory, the controller being configured to act as: an analysis unit configured to analyze print data of the held print job; a display unit configured to display a job selection screen on the display device, wherein the job selection screen includes one or more held print jobs at least including the held print job; and a receiving unit configured to receive a selection of the held print job and the print instruction for the selected held print job, via the job selection screen from the user, wherein the display unit is further configured to display, in the job selection screen, error information in association with the held print job, based on the analysis of the analysis unit.

Further features of the present invention will become apparent from the following description of exemplary embodiments with reference to the attached drawings.

BRIEF DESCRIPTION OF THE DRAWINGS

FIG. 3 is a diagram showing the relationship of FIG. 3A and FIG. 3B;

FIG. 3A is a flowchart showing a flow of prediction processing of a printing time at step S203;

DESCRIPTION OF THE EMBODIMENTS

In the following, embodiments for embodying the present invention are explained by using the drawings. The configurations shown in the following embodiments are merely exemplary and the present invention is not limited to the configurations shown schematically.

First Embodiment

In a printing system capable of performing hold printing, a delay in time occurs between the time of a user operating a host PC and inputting a print job to an image forming apparatus and the time of the user giving instructions to print the print job to cause the image forming apparatus to perform printing. Consequently, a printing system is known, which analyzes print data of the print job in the meanwhile and predicts a printing time from analysis results. In the present embodiment, such a printing system is taken as an example.

In the printing system such as this, in the case where the prediction processing of a printing time is not completed within a limit time, information indicating that a timeout has occurred is displayed in a print job list as results of the prediction of a printing time. However, it is not possible for a user to determine whether the timeout has occurred because the use rate of a CPU is high, because the size of the print data is too large, or because of an analysis error of the print data from the results of the prediction. Consequently, in the printing system such as this, in the case where a timeout has occurred in the prediction processing of a printing time, it is not possible for a user to correctly recognize whether or not the print data is incorrect. In the following, a printing system is explained, which enables a user to recognize whether the print data of a print job is incorrect before starting printing even in the case where a timeout has occurred in the prediction processing of a printing time.

<System Configuration>

Figure 1:
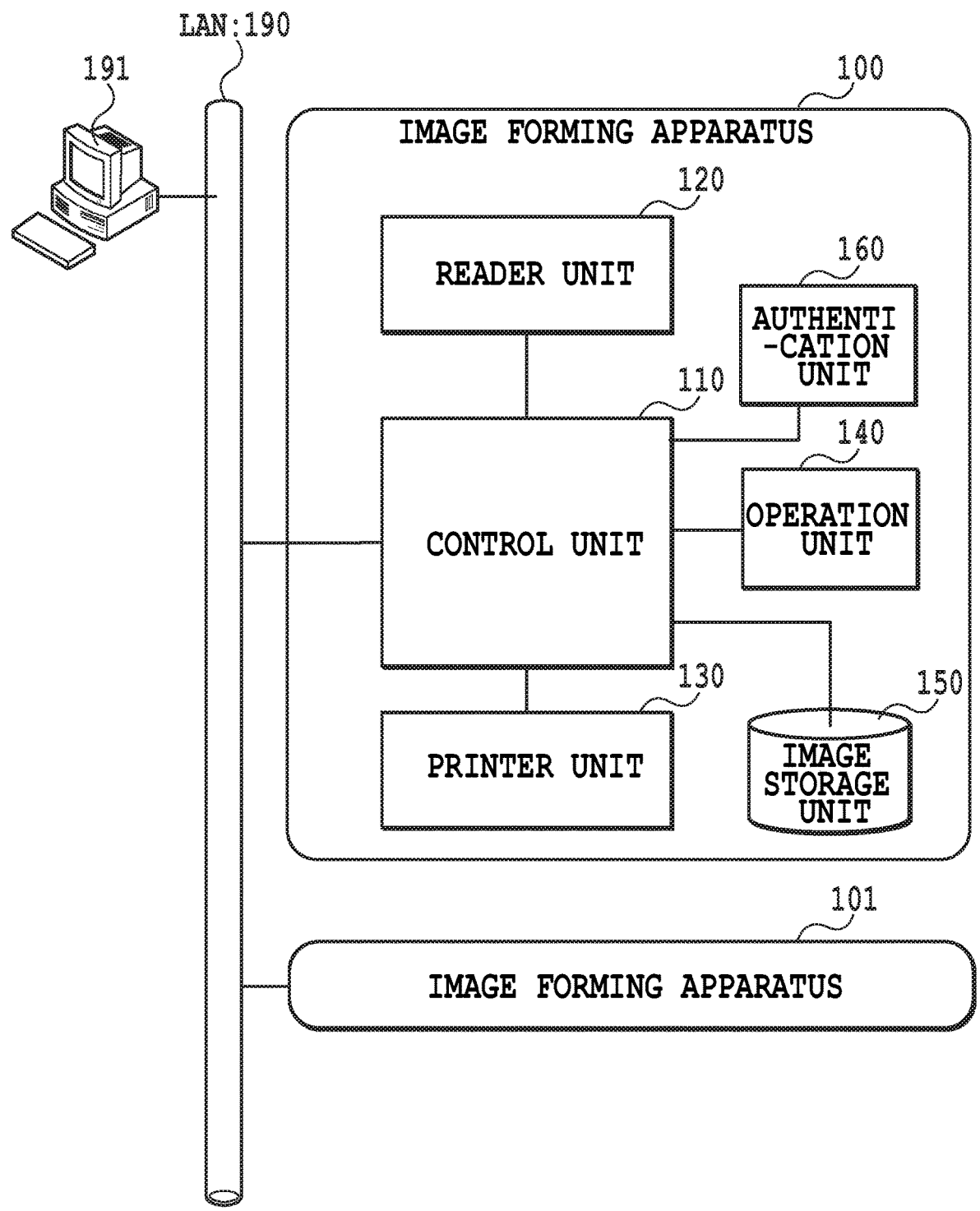
FIG. 1 is a block diagram showing an example of a configuration of a printing system in a first embodiment.

FIG. 1 is a block diagram showing an example of a configuration of a printing system in a first embodiment. The printing system shown in FIG. 1 includes image forming apparatuses 100 and 101 and a PC 191. The image forming apparatuses 100 and 101 and the PC 191 are connected to one another via a LAN (Local Area Network) 190, such as the Ethernet (registered trademark), so as to be capable of communication with one another. In the present embodiment, the communication between the image forming apparatuses 100 and 101 and the PC 191 uses the TCP/IP, but it may also be possible to use a protocol (for example, UDP) other than the TCP/IP. Further, in FIG. 1, two image forming apparatuses are illustrated, but the printing system may include any number of image forming apparatuses.

The image forming apparatuses 100 and 101 are each an MFP (Multi Function Printer) and perform processing in response to printing instructions from a host PC (in the present embodiment, PC 191). The image forming apparatus 100 and 101 may each be an SFP (Single Function Printer) or an LBP (Laser Beam Printer) other than the MFP. Further, the image forming apparatuses 100 and 101 may each be a printer that employs a print method other than the MFP, SEP, and LBP.

The image forming apparatus 100 and the image forming apparatus 101 have the same configuration. Consequently, in the following, the configuration of the image forming apparatus 100 is explained.

The image forming apparatus 100 includes a reader unit 120, a printer unit 130, an operation unit 140, an image storage unit 150, an authentication unit 160, and a control unit 110 configured to control each component.

The control unit 110 has a ROM, a RAM, a CPU, and so on, and the CPU centralizedly controls the entire image forming apparatus 100 based on programs stored in the ROM or another storage medium (for example, HDD or external memory), not shown schematically. Due to this, each of the above-described components is controlled. In the present embodiment, programs to perform processing shown in FIG. 2, FIG. 3A, FIG. 3B, and FIG. 5, to be described later, and programs to perform rendering processing and the like are stored in advance in the ROM and the like of the control unit 110. The CPU of the control unit 110 loads those programs onto the RAM and executes the loaded programs. The RAM of the control unit 110 is also used as a work area of the CPU. It may also be possible for dedicated hardware (not shown schematically) to perform various kinds of processing, such as rendering processing.

The reader unit 120 reads image data in accordance with instructions of the control unit 110. The printer unit 130 outputs image data by using a printer engine (not shown schematically) in accordance with instructions of the control unit 110.

The operation unit 140 includes operation keys for a user to perform operations and a liquid crystal panel (hereinafter, also called a display device) to display image data and set various functions. Further, the operation unit 140 notifies the control unit 110 of information that is input by a user operating the operation key and the liquid crystal panel. The operation unit 140 in the present embodiment displays a print job list shown in FIG. 4A, to be described later.

The image storage unit 150 stores data, such as print data. Further, the image storage unit 150 is made use of as a work area of the control unit 110.

The authentication unit 160 acquires user authentication information from an ID card and the like and notifies the control unit 110 of the user authentication information.

Next, an outline of processing that is performed by the host PC (PC 191) is explained. The PC 191 has a configuration similar to that of a common computer. Consequently, explanation of the configuration of the PC 191 is omitted.

A printer driver possessed by the PC 191 generates PDL data described in a page description language (PDL) based on a print command received from an application via an OS. The PDL data made up of PDL commands, which is converted and generated for each print command, is print data. Then, the PC 191 transmits the print data in units of jobs to the image forming apparatus 100 by the TCP/IP via the LAN 190. It is assumed that in the print data that is transmitted, user information to identify a user at the time of print data generation or at the time of transmission is embedded.

Figure 2:
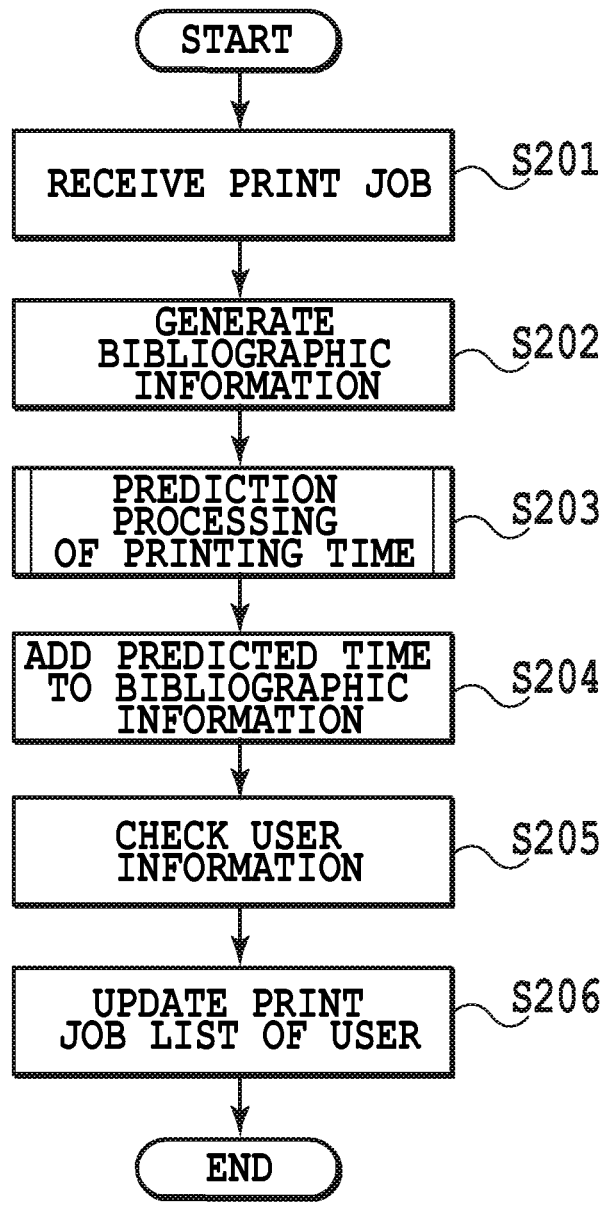
FIG. 2 is a flowchart showing a flow of updating processing of a print job list in the first embodiment.

FIG. 2 is a flowchart showing a flow of updating processing of a print job list in the first embodiment. Here, an example is used in which print data is stored in the image forming apparatus 100, but it may also be possible to separately prepare a print data storage server so that print data is stored in the server.

Upon receipt of the print job transmitted from the PC 191 via the LAN at step S201, the control unit 110 temporarily saves print data attached to the print job in the RAM within the control unit 110 or a work area provided in the image storage unit 150.

At step S202, the control unit 110 generates bibliographic information on the print job based on the print data within the above-described work area. Here, as the bibliographic information, for example, user information and device-independent information, such as the output color mode, the number of copies, one-side/both-side, and the number of pages, are generated. Further, for example, device-dependent information, such as stapling, image processing, and the sheet feed/discharge cassette, is generated. Furthermore, information for each page, such as the sheet size, is generated. It may also be possible to generate another piece of information as bibliographic information. The control unit 110 temporarily saves the generated bibliographic information in the above-described work area.

At step S203, the control unit 110 analyzes the print data (PDL data) within the above-described work area and predicts a printing time by using PDL analysis results obtained sequentially. The prediction of a printing time here is supposed to be performed before instructions to print the print job from a user are received for the first time after the reception of the print job (after the print data is saved in the above-described work area). This is referred to as performing the prediction of a printing time based on the reception of the print job. By doing so, as will be described later, in the case where an error has occurred in the prediction of a printing time, it is made possible to notify a user of information on the error before receiving instructions to print the held print job for the first time from a user. The prediction processing of a printing time performed by the control unit 110 will be described later by using FIG. 3A and FIG. 3B.

At step S204, the control unit 110 updates the bibliographic information by adding a printing predicted time and the PDL analysis results to the bibliographic information. In the case where an error code or the like is attached to the PDL analysis results obtained by the processing at step S203, the control unit 110 adds error contents derived from the error code to the bibliographic information. Further, the control unit 110 adds information on a page on which the error has occurred (for example, page number) to the bibliographic information. Here, the error code is the number that is displayed on the operation unit 140 in the case where an unrestorable error has occurred during the PDL analysis in the normal printing in which printing is performed without accumulating print data. The error code may be a character or a symbol as long as being capable of identifying an unrestorable error. In Table 1, a table showing a correspondence between the error No., the error contents, and the error message to be added to the bibliographic information is shown.

TABLE 1

| No. | Error contents | Error message |
|---|---|---|
| 1 | error has occurred and timeout has occurred | error has occurred on fourth page |
| 2 | timeout has occurred during time prediction | — |
| 3 | timeout has not occurred error has occurred on the way but can be skipped | 2 m error has occurred on 16th page skip is possible |
| 4 | timeout has not occurred page on which error has occurred cannot be skipped | 1 m error has occurred on 16th page skip is not possible |
| 5 | unrestorable error has occurred | printing is not possible (error code) |

In the following, there is a case where an error whose error No. is n is represented as an error #n. In the case where an error has occurred during the PDL analysis at step S203, the control unit 110 acquires the error No. corresponding to the error that has occurred. Here, the control unit 110 acquires the error No. by determining to which of the No. 1 error to No. 5 error shown in Table 1 the error that has occurred corresponds. In Table 1, the five errors are illustrated, but the number of kinds of error is not limited to five. For example, errors may be classified into six or more kinds of errors. Processing to determine to which error the error that has occurred corresponds will be described later by using FIG. 3A and FIG. 3B. The control unit 110 updates the contents of bibliographic information by checking the error No. obtained by the determination against the table shown in Table 1. Specifically, the control unit 110 adds the error message corresponding to the error No. to the bibliographical information on the corresponding print job. By displaying each error message shown in Table 1, it is possible to notify a user that a print job exists in the print job list, which causes an error to occur in the case where printing is started. For example, in the case where the error message corresponding to the error #1 is displayed in the print job list, it is possible for a user to recognize that an error has occurred during the PDL analysis and a timeout has occurred in the prediction processing of a printing time. Further, in the case where the error message corresponding to the error #5 is displayed in the print job list, it is possible for a user to recognize that printing is not possible. In the present embodiment, the case where printing is not possible is a case where an unrestorable error has occurred during the PDL analysis. Further, in the present embodiment, an error code is included in the error message corresponding to the error #5, and therefore, it is possible for a user to specify the kind of unrestorable error. In the case where the error message corresponding to the error #2 is displayed in the print job list, it is possible for a user to recognize that a timeout has just occurred in the prediction processing of a printing time. Because of this, it is possible for a user to give printing instructions while expecting completion of printing up to the last page without any error although the predicted value of the printing time is not known. Further, in the case where the error message corresponding to the error #3 is displayed in the print job list, it is possible for a user to recognize that printing can be performed up to the last page by skipping the page on which an error has occurred although the error occurs during the PDL analysis. Furthermore, in the case where the error message corresponding to the error #4 is displayed in the print job list, it is possible for a user to recognize that printing is possible up to the page before the page on which an error has occurred although the error occurs during the PDL analysis. The error messages shown in Table 1 are examples and it may also be possible to display another message as long as being of capable of recognizing the error contents.

At step S205, the control unit 110 specifies a user from the user information (for example, user ID) included in the bibliographic information.

At step S206, the control unit 110 updates the print job list of the specified user and terminates the present processing. Here, the control unit 110 adds the bibliographic information updated at step S204 to the print job list of the specified user. In the case where the print job list of the user specified at step S205 does not exist within the above-described work area, it is assumed that the control unit 110 newly creates a print job list.

Figure 3B:
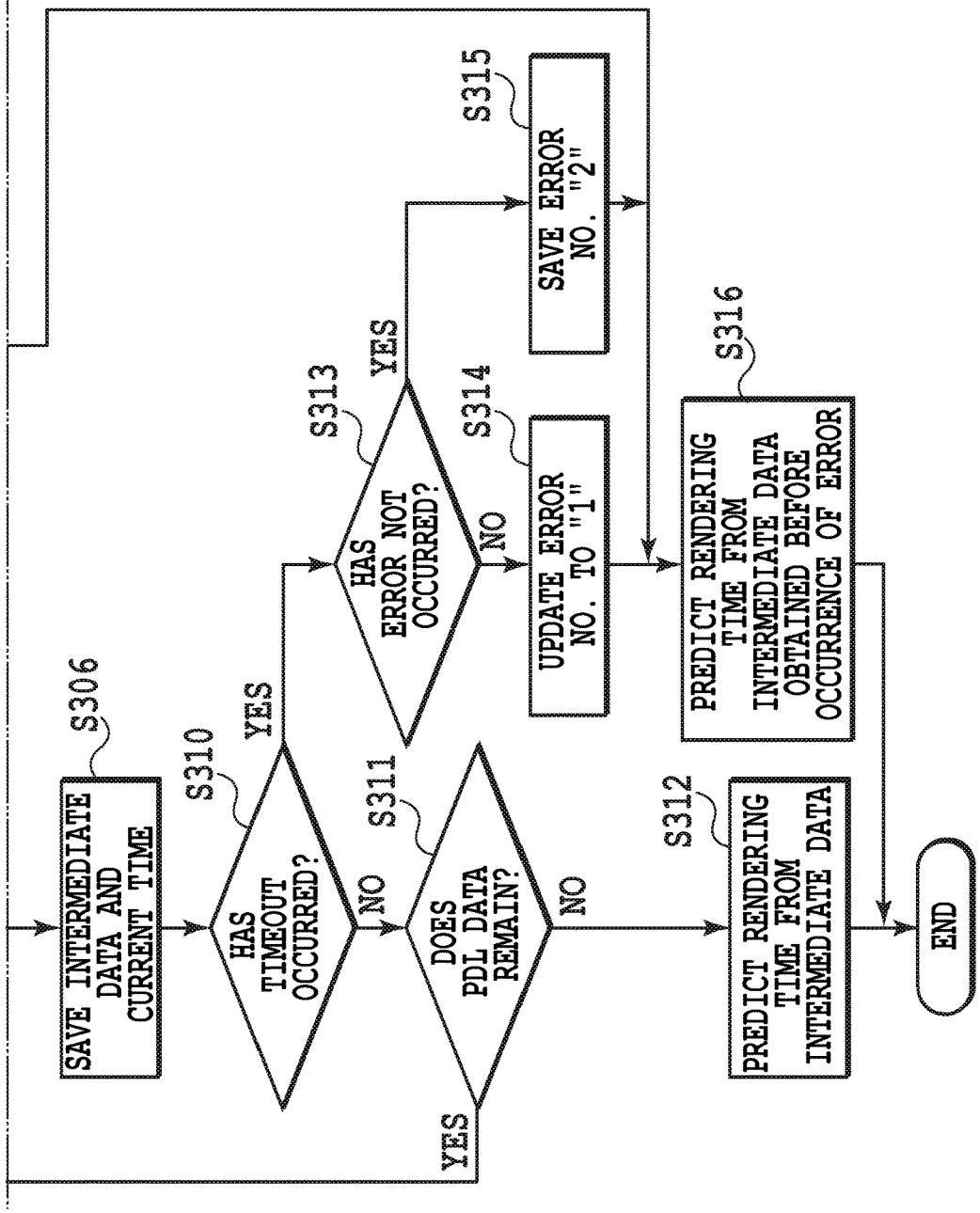
FIG. 3B is a flowchart showing a flow of prediction processing of a printing time at step S203.

FIG. 3A and FIG. 3B is a flowchart showing a flow of the prediction processing of a printing time at step S203. At step S301, the control unit 110 temporarily saves information indicating the start time of the PDL analysis in the above-described work area.

At step S302, the control unit 110 performs the analysis of print data (PDL data). The PDL analysis that is performed at this time is the same as the PDL analysis that is performed in the actual printing processing. The PDL data that is analyzed by the control unit 110 is, for example, PCL (Printer Control Language) and PS (PostScript). The kind of PDL data is not limited to those.

At step S303, the control unit 110 determines whether or not an error has occurred during the analysis of the PDL data. In the case where no error has occurred during the PDL analysis (NO at step S303), the processing advances to step S306. On the other hand, in the case where an error has occurred during the PDL analysis (YES at step S303), the processing advances to step S304. The case where it is determined that an error has occurred during the PDL analysis is, for example, a case where the data volume within the RAM or the image storage unit 150 has exceeded a limit value during the analysis of the PDL data. Further, the case is, for example, a case where a command that cannot be analyzed is included in the PDL data, that is, a case where a syntax error has occurred. Furthermore, the case is, for example, a case where an unexpected error has occurred, such as a case where the RAM or the image storage unit 150 has failed during the analysis of the PDL data. The error that is determined by the control unit 110 is not limited to those. Further, an error that depends on the PDL analysis system may exist for each type of PDL.

At step S304, the control unit 110 determines, from the contents of an error that has occurred at step S302, whether or not the error is restorable. In the case where the error that has occurred at step S302 is a restorable error (YES at step S304), the processing advances to step S305. On the other hand, in the case where the error that has occurred at step S302 is an unrestorable error (NO at step S304), the control unit 110 determines that it is not possible to further continue the PDL analysis. Then, the processing advances to step S307. The unrestorable error is, for example, an error that requires a service person call. As a specific example, the error is an error that occurs in the case where the RAM or the image storage unit 150 has failed during the analysis of the PDL data and the control unit 110 has failed to access the above-described work area.

At step S305, the control unit 110 determines whether or not an error skip is possible. In the case where the error skip is possible (YES at step S305), the processing advances to step S309. On the other hand, in the case where the error skip is not possible (NO at step S305), the control unit 110 determines that it is not possible to further continue the PDL analysis. Then, the processing advances to step S308. Here, the error skip is a function to skip the analysis of the drawing command in which an error has occurred and to continue the PDL analysis for the remaining drawing commands. In the case where the error skip is performed, the image (text, graphics, image, and so on) corresponding to the drawing command skipped by the error skip is not printed correctly at the time of performing printing. The error that can be skipped is, for example, an error that occurs in the case where a drawing command that is not compatible with the image processing capability of the image forming apparatus 100 (more specifically, the printer unit 130 of the image forming apparatus 100) is detected. As a specific example, the error is an error that occurs in the case where the dot intervals or the number of dots specified by a line drawing command is not compatible with the drawing processing capability of the printer unit 130. In the case where such a line drawing command is detected, the control unit 110 skips the analysis of the line drawing command. Alternatively, the control unit 110 continues the analysis of the line drawing command after reducing the number of dots specified by the line drawing command, and so on. Then, after the control unit 110 performs the PDL analysis for the remaining drawing commands, the processing advances to step S309. The error that cannot be skipped is, for example, an error that occurs in the case where the empty area runs short in the entire work area described above during the analysis of the PDL data, or a syntax error.

At step S306, the control unit 110 generates intermediate data from the PDL analysis results. Then, the control unit 110 temporarily saves the intermediate data and information indicating the current time (that is, the end time of the PDL analysis) in the above-described work area. In the case where the information indicating the current time is already saved in the above-described work area, the control unit 110 overwrites the information. The intermediate data includes drawing commands to perform rendering of each attribute, such as text, graphics, and image. In the present embodiment, the control unit 110 calculates the time from the start of the PDL analysis until rendering is completed by predicting the time required for rendering from the number of drawing objects of the intermediate data without performing rendering based on the intermediate data. As the time prediction method, another method may be used. Further, it may also be possible for the control unit 110 to find an actually measured value of the time required for rendering by generating bitmap data by actually performing rendering.

At steps S307 to S309, the control unit 110 temporarily saves the intermediate data obtained by performing the PDL analysis and the error No. in the above-described work area. In the case where the error code is obtained, the error code is also saved temporarily in the above-described work area.

At step S307, "5" is saved as the error No. and the processing advances to step S316. At step S308, "4" is saved as the error No. and the processing advances to step S316. At step S309, "3" is saved as the error No. and the processing advances to step S306.

At step S310, the control unit 110 acquires information indicating the start time of the PDL analysis and information indicating the current time from the above-described work area. The control unit 110 calculates the PDL analysis time from a difference between the start time of the PDL analysis and the current time. In the case where the calculated PDL analysis time exceeds a predetermined limit time, that is, in the case where a timeout has occurred (YES at step S310), the processing advances to step S313. In the present embodiment, information indicating the limit time of the PDL analysis time is stored in advance in the above-described work area by the control unit 110. On the other hand, in the case where the calculated PDL analysis time does not exceed the predetermined limit time (NO at step S310), the processing advances to step S311.

At step S311, the control unit 110 determines whether there remains unanalyzed PDL data in the print job received at step S201. In the case where there remains unanalyzed PDL data (YES at step S311), the processing returns to step S302. On the other hand, in the case where there remains no unanalyzed PDL data (NO at step S312), the processing advances to step S312.

At step S312, the control unit 110 predicts a rendering time from the number of drawing objects included in the intermediate data generated from each piece of PDL data. The control unit 110 temporarily saves the sum of the predicted rendering time and the PDL analysis time calculated at step S310 in the above-described work area as the printing predicted time.

At step S313, the control unit 110 determines whether a PDL analysis error has not occurred. As described above, in the case where a PDL analysis error has occurred and one of the processing at steps S307 to S309 described above is performed, the error No. is saved in the above-described work area. Consequently, in the case where the error No. is not saved in the above-described work area, it is possible for the control unit 110 to determine that the PDL analysis error has not occurred. In the case where the PDL analysis error has occurred (NO at step S313), the processing advances to step S314. On the other hand, in the case where the PDL analysis error has not occurred (YES at step S313), the processing advances to step S315.

At step S315, the control unit 110 saves the error No. "2" in the above-described work area.

At step S314, the control unit 110 updates the error No. saved in the above-described work area to "1".

At step S316, the control unit 110 predicts the rendering time from the number of pieces of the drawing data included in the intermediate data obtained before the occurrence of the PDL analysis error. Further, the control unit 110 calculates the PDL analysis time as in the processing at step S310. Then, the control unit 110 temporarily saves the sum of the predicted rendering time and the calculated PDL analysis time in the above-described work area as the printing predicted time.

In FIG. 3A and FIG. 3B, the example is shown in which after the processing at step S307, the processing at step S316 is performed, but it may also be possible for the control unit 110 to terminate the prediction processing of a printing time without performing the processing at step S316 after the processing at step S307.

Figure 4A:
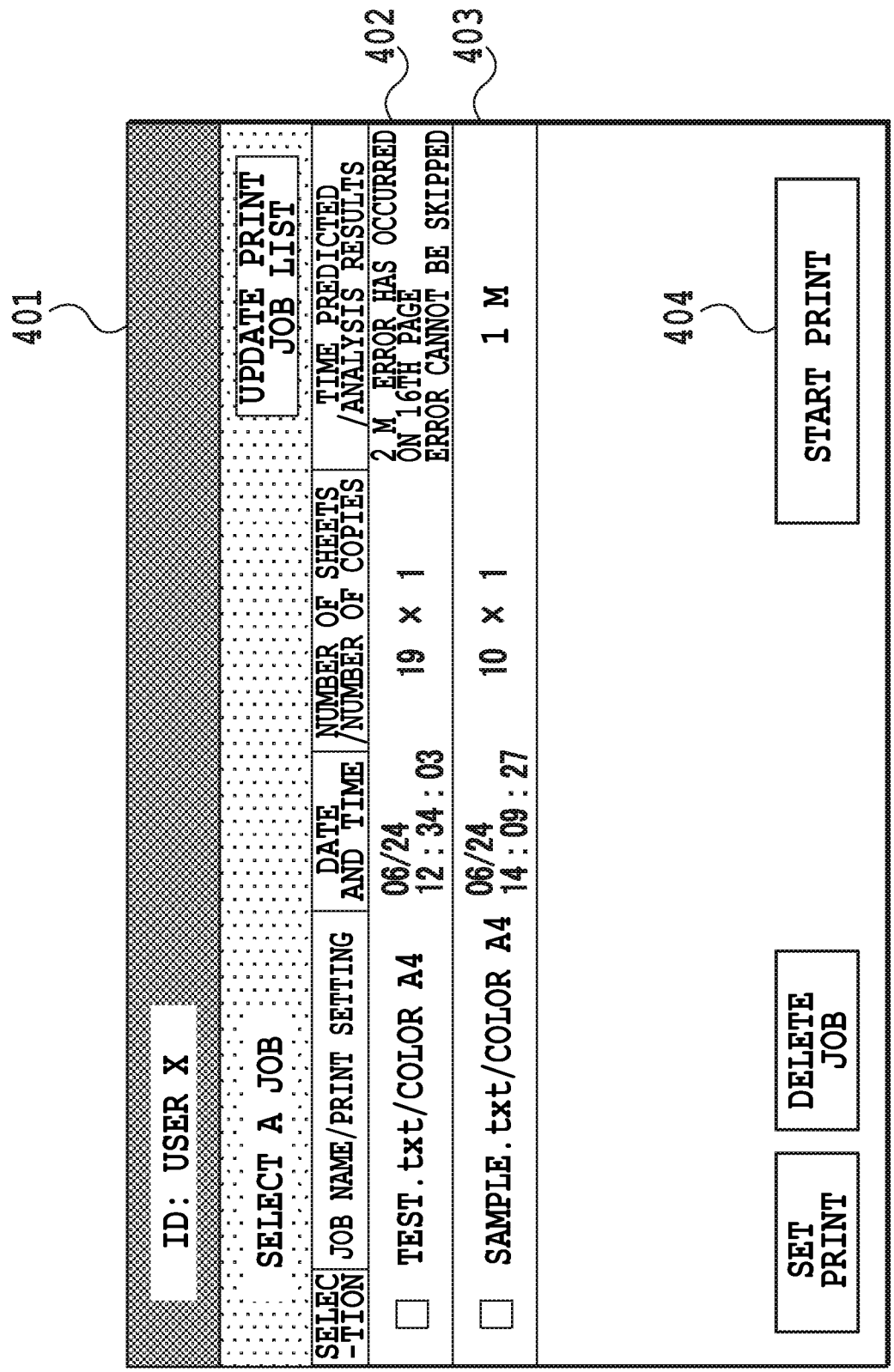
FIG. 4A and FIG. 4B are each a diagram showing an example of a screen that is displayed on an operation unit.
Figure 4B:
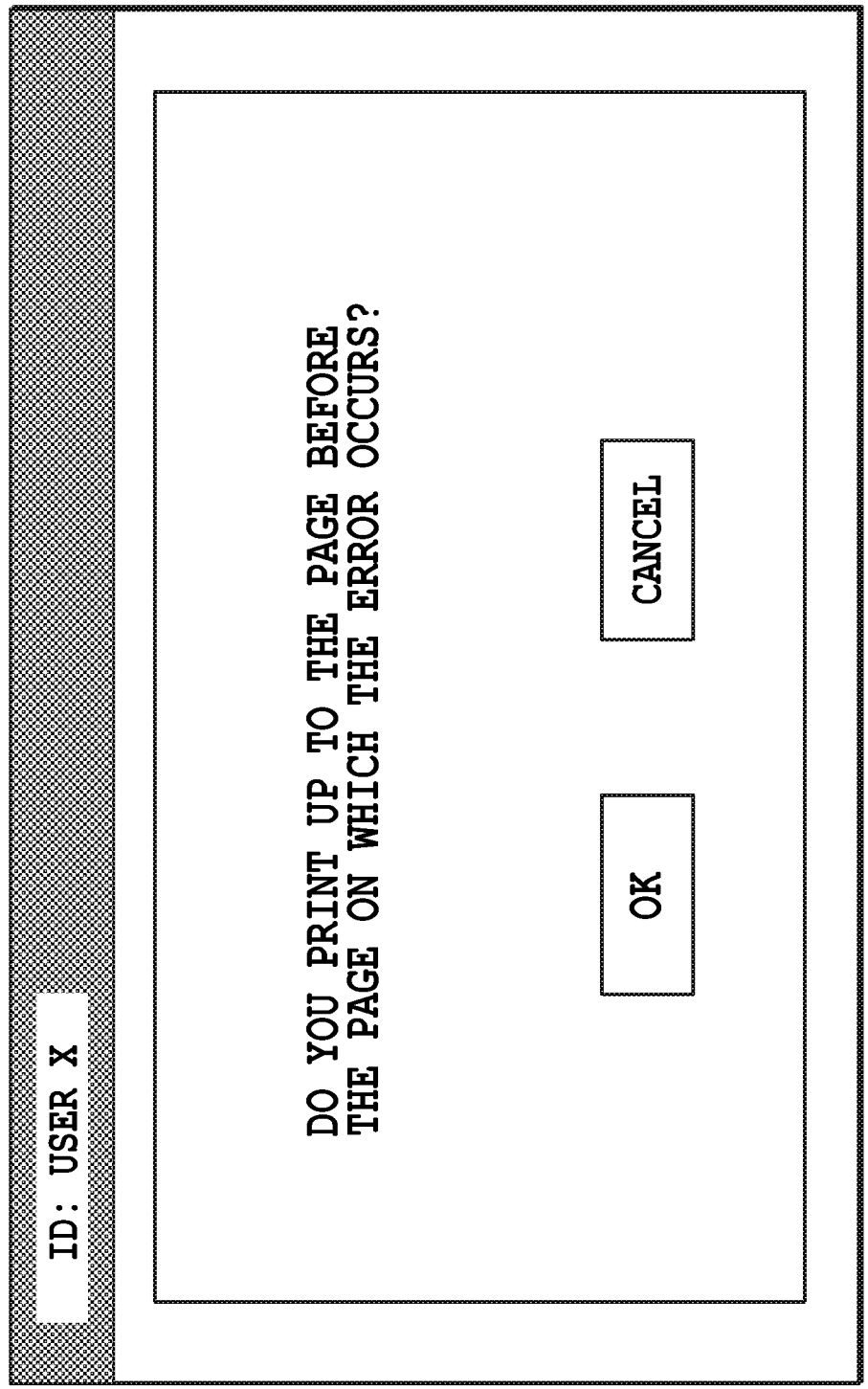

FIG. 4A and FIG. 4B are each a diagram showing an example of the screen that is displayed on the operation unit 140. FIG. 4A shows an example of the print job list that is displayed on the operation unit 140, which has been updated by the control unit 110 at step S206. As shown in FIG. 4A, the print job list includes a "Job name/print setting" field that indicates the name and printing setting of a print job. Further, the print job list includes a "Date and time" field that indicates the date and time at which the print job is received. Further, the print job list includes a "Number of sheets/number of copies" field that indicates the number of sheets and the number of copies specified in the print job. Further, the print job list includes a "Time predicted/analysis results" field that indicates PDL analysis results obtained by performing the processing shown in FIG. 2 and FIG. 3A and FIG. 3B. In FIG. 4A, the print job list of a user whose user ID is "User X" is displayed. Here, a print job list 401 presents to a user that a print job 402 is a job in which a PDL analysis error that cannot be skipped has occurred on the sixteenth page of the nineteen pages and only up to the fifteenth page can be printed. Further, the print job list 401 presents to a user that a print job 403 is a job in which a PDL analysis error will not occur on all the pages (ten pages).

On the screen shown in FIG. 4A, in the case where a user selects the print job 402 within the print job list 401 and presses down a Start print button 404, the control unit 110 causes the screen of the operation unit 140 to make a transition into the screen shown in FIG. 4B. FIG. 4B shows an example of a screen (hereinafter, referred to as a printing start check screen) to cause a user to determine whether to perform printing up to the page before the page on which a PDL analysis error occurs. In the case where an "OK" button on the screen shown in FIG. 4B is pressed down by a user, the control unit 110 starts printing up to the fifteenth page of "test.txt". On the other hand, in the case where a "Cancel" button is pressed down by a user, the screen of the operation unit 140 makes a transition into the screen shown in FIG. 4A.

Figure 5:
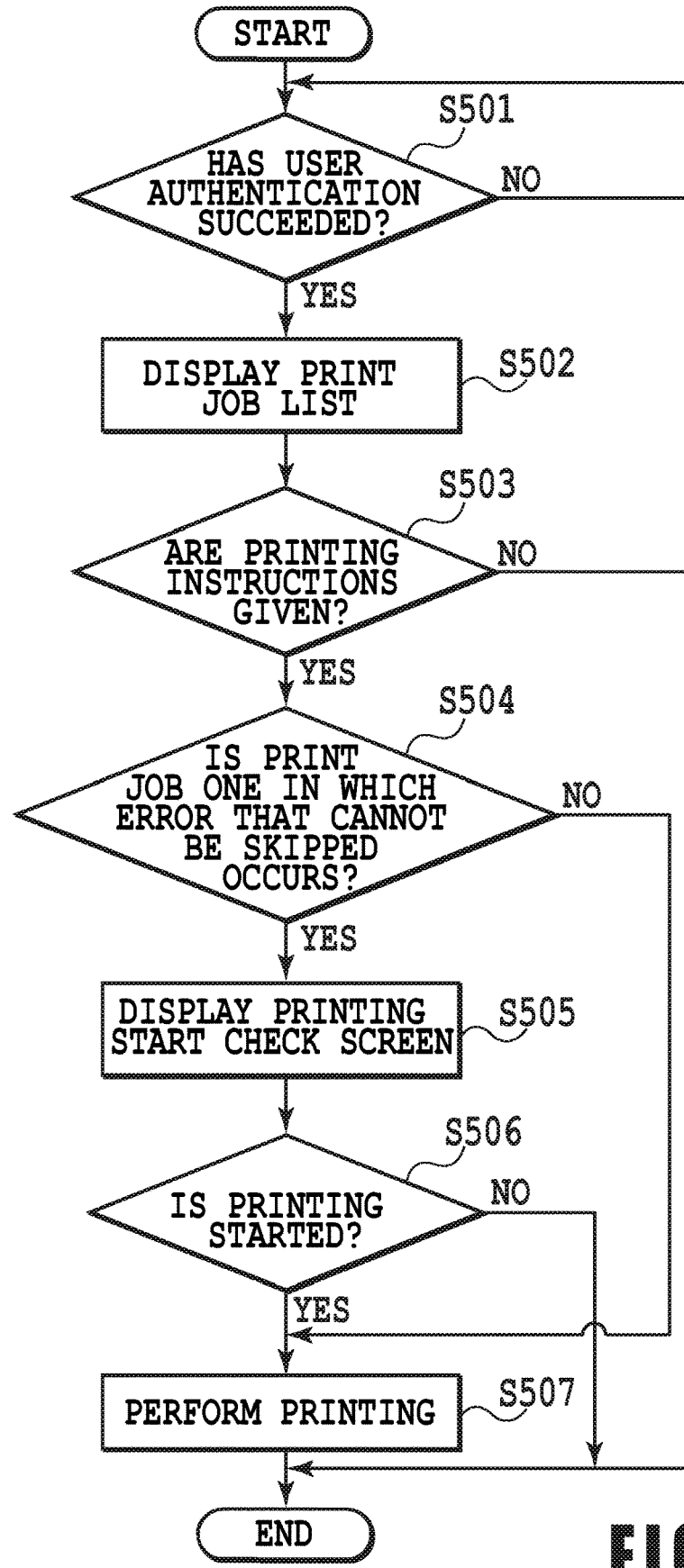
FIG. 5 is a flowchart showing a flow of printing processing in an image forming apparatus.

FIG. 5 is a flowchart showing a flow of printing processing in the image forming apparatus 100. In the case where user authentication information is input by a user at step S501, the authentication unit 160 transmits the user authentication information to the control unit 110. The control unit 110 collates the received user authentication information with the user information registered in advance and determines whether to permit the user to operate the image forming apparatus 100. In other words, whether the user authentication has succeeded is determined. The user information is saved in advance in the above-described work area by a user registration operation for the image forming apparatus 100. The configuration may be one in which collation is performed by making use of the user information saved in an external device (for example, the image forming apparatus 101). Further, it may also be possible to perform the authentication processing at step S501 by an external device. In that case, it is sufficient for the control unit 110 to acquire determination results from the external device via a communication line, such as the LAN 190. In the case where the results of the collation indicates that the user authentication has succeeded (YES at step S501), the processing advances to step S502. At this time, the control unit 110 gives authentication notification. For example, the control unit 110 displays the authentication results on the operation unit 140. On the other hand, in the case where the user authentication has failed (NO at step S501), the processing returns to step S501 and the control unit 110 waits for an input of user information again. At this time, in the case where user information is not input after a predetermined time elapses, the control unit 110 terminates the processing.

At step S502, the control unit 110 outputs the bibliographic information on a user whose authentication has succeeded to the operation unit 140. Due to this, the print job list 401 shown in FIG. 4A is displayed on the operation unit 140.

At step S503, the control unit 110 determines whether or not printing instructions are given by a user via the operation unit 140. Here, the control unit 110 determines whether a print job is selected from the print job list 401 and the Start print button 404 is pressed down within a predetermined time. In the case where printing instructions are given (YES at step S503), the processing advances to step S504. On the other hand, in the case where no printing instructions are given (NO at step S503), the present processing is terminated.

At step S504, the control unit 110 determines whether or not the print job is a print job in which an error that cannot be skipped occurs from the bibliographic information on the print job selected by a user via the operation unit 140. In the case where the print job is a print job in which an error that cannot be skipped occurs (YES at step S504), the processing advances to step S505. On the other hand, in the case where the print job is a print job in which an error that cannot be skipped does not occur (NO at step S504), the processing advances to step S507.

At step S505, the control unit 110 displays the printing start check screen shown in FIG. 4B on the operation unit 140. Due to this, it is possible to make an inquiry to a user about whether printing up to the page before the page on which an error that cannot be skipped occurs is performed.

In the case where a user presses down the "OK" button on the printing start check screen shown in FIG. 4B at step S506 (YES at step S506), the processing advances to step S507. On the other hand, in the case where the "Cancel" button on the screen shown in FIG. 4B is pressed down by a user (NO at step S506), the control unit 110 terminates the present processing without starting printing.

At step S507, the control unit 110 starts printing. Specifically, the control unit 110 starts the PDL analysis of print data of the print job selected by a user and generates intermediate data from the analysis results. The control unit 110 performs rendering based on the intermediate data and saves the image data obtained by performing rendering in the above-described work area. The control unit 110 transmits the image data to the printer unit 130. The printer unit 130 performs a series of printing processing for a printing medium, such as paper, based on the received image data.

As above, in the present embodiment, as shown in FIG. 2, FIG. 3A and FIG. 3B, at the timing at which the print job received from the host PC is held, the control unit 110 performs the prediction processing of a printing time (PDL analysis). Then, the control unit 110 includes the PDL analysis results in the bibliographic information on the print job at the time of registering the received print job in the print job list. Further, the control unit 110 notifies a user of the PDL analysis results by displaying the above-described PDL analysis results in the print job list that is displayed on the operation unit 140 after user authentication. Due to the processing such as this, according to the present embodiment, it is possible to notify a user of whether the print data of the print job is incorrect.

In the present embodiment, by displaying the PDL analysis results in the print job list, a user is notified of whether or not the print data of the print job is incorrect, but notification to a user may be implemented in any aspect. As long as it is possible to enable a user to recognize whether or not the print data of the print job input to the image forming apparatus is incorrect, notification to a user may be implemented in any aspect.

In the present embodiment, in the case where the prediction processing of a printing time is not completed within a limit time, the control unit 110 switches messages to be displayed in accordance with the factor of the timeout as shown in Table 1 rather than uniformly displaying a message indicating that a timeout has occurred. Consequently, also in the printing system in which the prediction processing of a printing time is performed, it is possible to enable a user to appropriately recognize whether the print data of the print job is incorrect before starting printing.

In the present embodiment, as shown in FIG. 4A, even in the case where an error has occurred during the PDL analysis, on a condition that printing up to a page on the way is possible, a user is notified of this. Further, as shown in FIG. 4B, a screen to make an inquiry to a user about whether or not printing up to a page on the way is performed is displayed. Consequently, according to the present embodiment, it is possible to save time and effort of a user to give instructions to abort printing after printing starts.

In the present embodiment, the case is taken as an example where all the print jobs received from the host PC are held, but it may also be possible for the control unit 110 to hold a print job for which hold printing is specified of the received print jobs. Then, it may also be possible for the control unit 110 to perform the normal printing in which printing is started without accumulating print data for the print job for which hold printing is not specified.

OTHER EMBODIMENTS

As above, the embodiments of the present invention are described in detail, but it may also be possible to apply the above-described embodiments to a system made up of a plurality of devices or to an apparatus including one device. For example, mention is made of a scanner, a printer, a PC, a copy machine, a multi function printer, a facsimile device, and so on.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to notify a user of whether a held print job is incorrect before starting printing in hold printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-224924, filed Nov. 18, 2016, which is hereby incorporated by reference wherein in its entirety.

What is claimed is:

1. An image forming apparatus comprising:
a controller configured to predict a processing time for printing a print data included in a print job during a PDL analysis;
an operation unit configured to display at least one print job and the predicted processing time and receive an instruction of printing of the displayed print job; and
a printer configured to print an image on a sheet based on the print data included in the displayed print job according to receiving the instruction of printing of the displayed print job by the operation unit,
wherein the operation unit displays identifiably a case where the controller cannot predict the processing time within a predetermined time, and a case where an error has occurred during the PDL analysis and when a timeout has occurred in a prediction process of the predicted processing time.

2. The image forming apparatus according to claim 1, wherein the controller determines an occurrence of a timeout in a case where a difference between a starting time of the prediction of the predicted processing time and an ending time of the prediction process of the predicted processing time exceeds the predetermined time.

3. The image forming apparatus according to claim 1, wherein the operation unit displays, in the case where the error has occurred during the PDL analysis and when the timeout has occurred in the prediction process of the predicted processing time, error information on the print job at which the error has occurred.

4. The image forming apparatus according to claim 3, wherein the controller determines whether or not the error occurring when the predicted processing time is a restorable error, and
the operation unit displays, as the error information, information indicating that printing is not possible, in a case where it is determined that the error in the PDL analysis is not a restorable error.

5. The image forming apparatus according to claim 4, wherein the controller determines, in a case where the error in the PDL analysis is a restorable error, whether or not the error in the PDL analysis is an error that can be skipped, and the operation unit displays, as the error information, at least information indicating that an error that can be skipped occurs in a case where it is determined that the error can be skipped.

6. The image forming apparatus according to claim 5, wherein
the controller determines an error that occurs in a case where a drawing command, which is not compatible with drawing processing capability of the image forming apparatus, is detected in the print data to be an error that can be skipped.

7. The image forming apparatus according to claim 5, wherein
the operation unit displays, as the error information, information indicating that an error that cannot be skipped occurs, in a case where it is determined that the error is an error that cannot be skipped.

8. The image forming apparatus according to claim 7, wherein
in a case where the printing instructions are input for a print job in which an error that cannot be skipped occurs, the operation unit displays a message that prompts a user to perform an operation to determine whether nor not to perform printing up to a page before a page on which the error that cannot be skipped occurs.

9. The image forming apparatus according to claim 5, wherein
the operation unit displays, as the error information, information indicating that an error that can be skipped occurs and a page number at which the error occurs.

10. The image forming apparatus according to claim 9, wherein
in a case where the operation unit receives information indicating that an error that can be skipped occurs and an instruction of printing of the print job with the page number at which the error occurs, the controller skips the page number at which the error occurs and performs the print job.

11. The image forming apparatus according to claim 1, wherein in a case where it is determined that the error occurring when the predicted processing time is a restorable error, the display device displays as the error information, a cause of the error with a page number at which the error occurs.

12. The image forming apparatus according to claim 3, wherein
the operation unit displays contents of the error without displaying the predicted processing time in a case where the error occurs when the controller predicts the processing time.

13. The image forming apparatus according to claim 1, wherein the controller receives the print job and predicts the processing time of the print data included in the print job after receiving the print job.

14. The image forming apparatus according to claim 1, wherein the memory holds a plurality of print jobs, and the display device displays the plurality of print jobs and the predicted processing times respectively corresponding to the plurality of print jobs.

15. The image forming apparatus according to claim 1, wherein the controller performs PDL analysis for the print data including in the print job and predicts an execution time of rendering processing based on intermediate data obtained by the PDL analysis of the print data, and the predicted processing time includes a predicted execution time of rendering processing.

16. The image forming apparatus according to claim 15, wherein
in a case where an error occurs during the PDL analysis, the predicted processing time includes the predicted execution time of the rendering processing based on intermediate data which is acquired before the error occurs.

17. The mage forming apparatus according to claim 15, wherein
the predicted processing time does not include the predicted execution time of rendering processing.

18. The image forming apparatus according to claim 1, wherein
the operation unit does not display the predicted processing time in a case where the controller cannot predict the processing time within the predetermined time.

19. The image forming apparatus according to claim 13, further comprising: a memory configured to store the received print job, wherein the operation unit displays the print job stored in the memory.

20. A control method of an image forming apparatus comprising:
predicting a processing time for printing a print data included in a print job during a PDL analysis;
displaying at least one print job and the predicted processing time and receiving an instruction of printing of the displayed print job; and
printing an image on a sheet based on the print data included in the displayed print job according to receiving the instruction of printing of the displayed print job,
wherein the displaying displays identifiably a case where the processing time cannot be predicted within a predetermined time, and a case where an error has occurred during the PDL analysis and when a timeout has occurred in a prediction process of the predicted processing time.

21. A non-transitory computer readable storage medium storing a program for causing a computer to perform a control method of an image forming apparatus, the control method comprising:
predicting a processing time for printing a print data included in a print job during a PDL analysis;
displaying at least one print job and the predicted processing time and receiving an instruction of printing of the displayed print job; and
printing an image on a sheet based on the print data included in the displayed print job according to receiving the instruction of processing of the displayed print job, wherein the displaying displays identifiably a case where the controller cannot predict the processing time within a predetermined time, and a case where an error has occurred during the PDL analysis and when a timeout has occurred in a prediction process of the predicted processing time.

* * * * *